(12) United States Patent
Chen et al.

(10) Patent No.: US 11,476,909 B2
(45) Date of Patent: Oct. 18, 2022

(54) AUTOMATIC ANTENNA BEAM ALIGNMENT

(71) Applicant: Hewlett Packard Enterprise Development LP, Houston, TX (US)

(72) Inventors: Yuying Chen, Beijing (CN); Kuanyue Li, Beijing (CN); Jianpo Han, Beijing (CN)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 17/101,631

(22) Filed: Nov. 23, 2020

(65) Prior Publication Data

US 2022/0166476 A1 May 26, 2022

(51) Int. Cl.
| | |
|---|---|
| *H04B 7/02* | (2018.01) |
| *H04L 1/02* | (2006.01) |
| *H04B 7/06* | (2006.01) |
| *G01C 17/02* | (2006.01) |
| *G01S 19/01* | (2010.01) |
| *H04B 7/08* | (2006.01) |

(52) U.S. Cl.
CPC ............ *H04B 7/061* (2013.01); *G01C 17/02* (2013.01); *G01S 19/01* (2013.01); *H04B 7/0834* (2013.01)

(58) Field of Classification Search
CPC ...... H04B 7/061; H04B 7/0834; G01C 17/02; G01S 19/01
USPC ......................................................... 375/267
See application file for complete search history.

(56) References Cited

U.S. PATENT DOCUMENTS

| | | | | |
|---|---|---|---|---|
| 2017/0093475 A1* | 3/2017 | Smith | ................... | H04B 7/022 |
| 2019/0319686 A1* | 10/2019 | Chen, IV | ............ | H04W 72/046 |
| 2021/0109145 A1* | 4/2021 | Haustein | .............. | H04B 17/318 |

FOREIGN PATENT DOCUMENTS

WO        2018/017840 A1      1/2018

* cited by examiner

*Primary Examiner* — Tanmay K Shah
(74) *Attorney, Agent, or Firm* — Hewlett Packard Enterprise Patent Department

(57) ABSTRACT

Embodiments of the present disclosure relate to automatic antenna beam alignment. A method comprises determining first position-related information indicating a first location and a first orientation of a first communication device. The first communication device comprises a plurality of antenna sectors configured for generating respective directional beams. The method also comprises receiving, from a second communication device, second position-related information indicating a second location and a second orientation of the second communication device. The method also further comprises selecting a subset of the plurality of antenna sectors based on the first and the second position-related information; and causing the first communication device to perform beamforming training with the second communication device using the selected subset of antenna sectors. A decreased number of antenna sectors are scanned during the beamforming training, which can reduce the time overhead and facilitate the devices to find the best beam efficiently.

14 Claims, 7 Drawing Sheets

AUTOMATIC ANTENNA BEAM ALIGNMENT

BACKGROUND

Many communication devices, such as access points (APs), are capable of wirelessly communicating with other devices. For example, devices may communicate with each other via wireless local area networks (WLANs) using corresponding communication technologies (such as Wi-Fi technologies). To this end, communication devices usually include antennas to enable the devices to transmit and receive signals. In order to overcome the increased attenuation of millimeter wave, a multi-sector antenna configuration is applied in communication devices, to generate multiple directional beams available for communication. With high directionality in the multi-sector antenna configuration, the devices may implement beamforming training to match the potentially narrow directions of their respective beams in order to establish a communication link.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, where.

DETAILED DESCRIPTION

Figure 1:
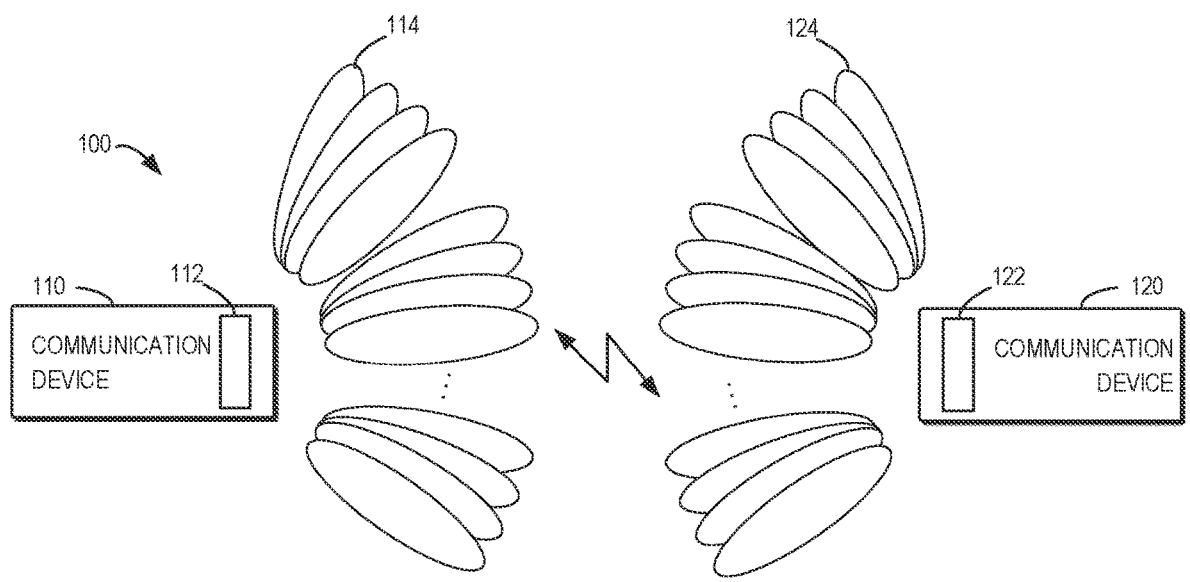
FIG. 1 illustrate a block diagram of an example communication environment in which example embodiments of the present disclosure can be implemented.

As described above, beamforming training is implemented by communication devices with multi-sector antenna configurations to connect with each other. Example embodiments of the present disclosure relate to antenna beam alignment based on the beamforming training. FIG. 1 illustrates an example environment 100 in which example embodiments of the present disclosure can be implemented. In the example environment 100, two communication devices 110 and 120 are to establish a communication link with each other.

The communication devices 110 and 120 may be configured to transmit and receive using the wireless communication protocols such as Institute of Electrical and Electronic Engineers (IEEE) 802.11 standards. The IEEE 802.11 standards may include the IEEE 802.11ay standard (e.g., operating at 60 GHz), the IEEE 802.11ad standard (sometimes referred to as "WiGig"), or any other wireless communication standards.

In some example embodiments, the communication devices 110 and/or 120 may comprise access points (APs). As used herein, an access point (AP) may comprise, be implemented as, or known as a Radio Router, Radio Transceiver, switch, Wi-Fi hotspot device, Basic Service Set (BSS), Extended Service Set (ESS), Radio Base Station (RBS), or some other terminology. In some example embodiments, during communication, one of the communication devices 110 and 120 may work in an operation mode by taking the role of an AP, and the other one may work in an operation mode by taking the role of a station (STA).

In the illustrated example, the communication devices 110 and 120 each may have an antenna array 112, 122 to facilitate communication with one or more other devices. Each of the antenna arrays 112, 122 may have a multi-sector antenna configuration, with a plurality of antenna elements to form a plurality of antenna sectors. The plurality of antenna sectors can thus generate respective beams 114, 124 in different directions for communication.

Figure 2:
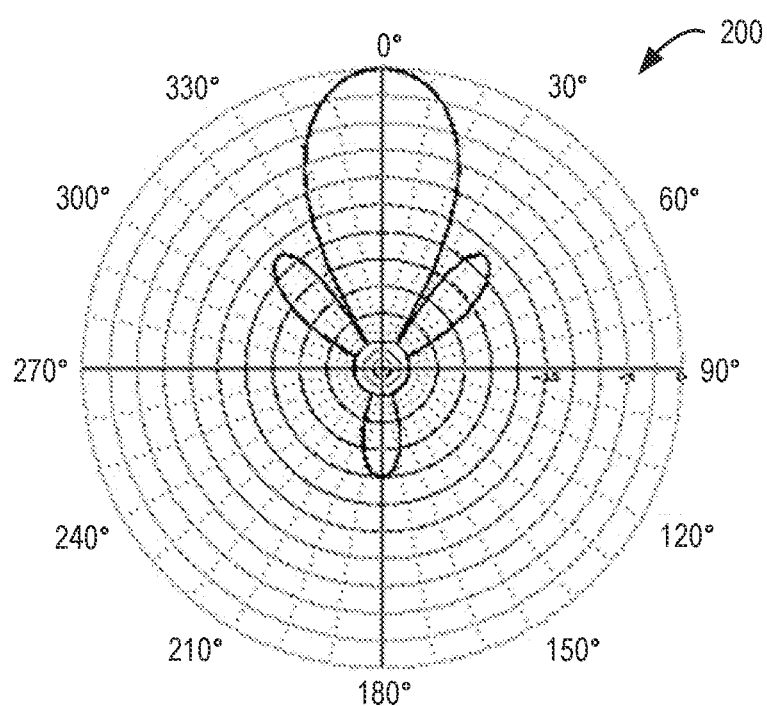
FIG. 2 illustrates an example directional antenna pattern for a beam.

As illustrated, abeam 114, 124 radiates radio waves to a specific direction. The beam 114, 124 may be referred to as a directional beam, and the antenna sectors may also be referred to as directional antenna sectors. FIG. 2 illustrates an example directional antenna pattern 200 for a directional beam.

Typically, a directional antenna radiates with higher power than an omnidirectional antenna in the direction associated with the antenna. This allows the device to increase its gain performance on transmission and reception. For this reason, the directional beam can help compensate signal attenuation for long distance communication, which is especially beneficial for millimeter wave communication with high attenuation.

However, due to the high directionality in the multi-sector antenna configuration, the communication devices 110 and 120 need to negotiate with each other to select the directional beams aligned with each other. The communication devices 110 and 120 may implement antenna beam alignment based on a beamforming training procedure, so as to determine the best match antenna sectors or beams for communication. The beamforming training procedure may be triggered after the communication device 110 or 120 boots up or periodically during the communication. After the successful completion of beamforming training, a communication link may be established between the communication devices 110 and 120 based on the determined match beams.

The beamforming training involves a sector level sweep (SLS) process for scanning in unit of antenna sector and a beam refinement phase (BRP). Traditionally, two devices are required to try all possible combinations of transmitter-receiver sectors during the beamforming training. That is, a communication device may control each antenna sector as a transmit sector to generate a transmit beam and try to search for any match receive beam from another communication device. The communication device may also control each antenna sectors as a receive sector to generate a receive beam and try to match any transmit beam of the other communication device. As such, the time cost for the beamforming training highly depends on the number of antenna sectors in both the communication devices. For example, the total scan time in the beamforming training may be determined as follows:

SCAN_TIME=TX_SECTOR_NO*RX_SECTOR_NO*SCAN_DWELL_TIME*CHAN_NO where "SCAN_TIME" represents the total scan time, "TX_SECTOR_NO" represents the number of transmit antenna sectors, "RX_SECTOR_NO" represents the number of receive antenna sectors, "SCAN_DWELL_TIME" represents the dwell time for each scan in unit of seconds, "CHAN_NO" represents the number of channels, and the symbol "*" represents a multiply operation.

As more antenna sectors are introduced, the time overhead for the beamforming training is increased, which is undesirable. For example, as compared with an indoor AP, the outdoor AP may require more antenna sectors for coverage or range consideration. It is assumed that an AP has 32 antenna sectors and supports three channels. The total scan time will be more than 5 minutes (=32*32*100*3 seconds) if the dwell time for each scan is 100 seconds. Accordingly, it is desirable to minimize or reduce the amount of time overhead.

Various example embodiments of the present disclosure propose a more efficient way to control antenna beam alignment based on the beamforming training. Specifically, for a pair of communication devices with multiple antenna sectors available for communication, position-related information of the devices, such as their locations and orientations, are exchanged between the devices before the beamforming training. Each of the devices can select at least one but not all of its antenna sectors for performing the beamforming training based on its position-related information and the position-related information from the peer device. A beam(s) generated by the selected antenna sector(s) may be in a direction(s) within an angle range aligned to the peer device. By selecting a subset of the antenna sectors that are more likely to match with the peer device, a decreased number of antenna sectors are needed to be scanned during the beamforming training, which can reduce the time overhead and facilitate the devices to find the best beam efficiently.

Some example embodiments of the present disclosure will be discussed in detail below with reference to other figures.

Figure 3:
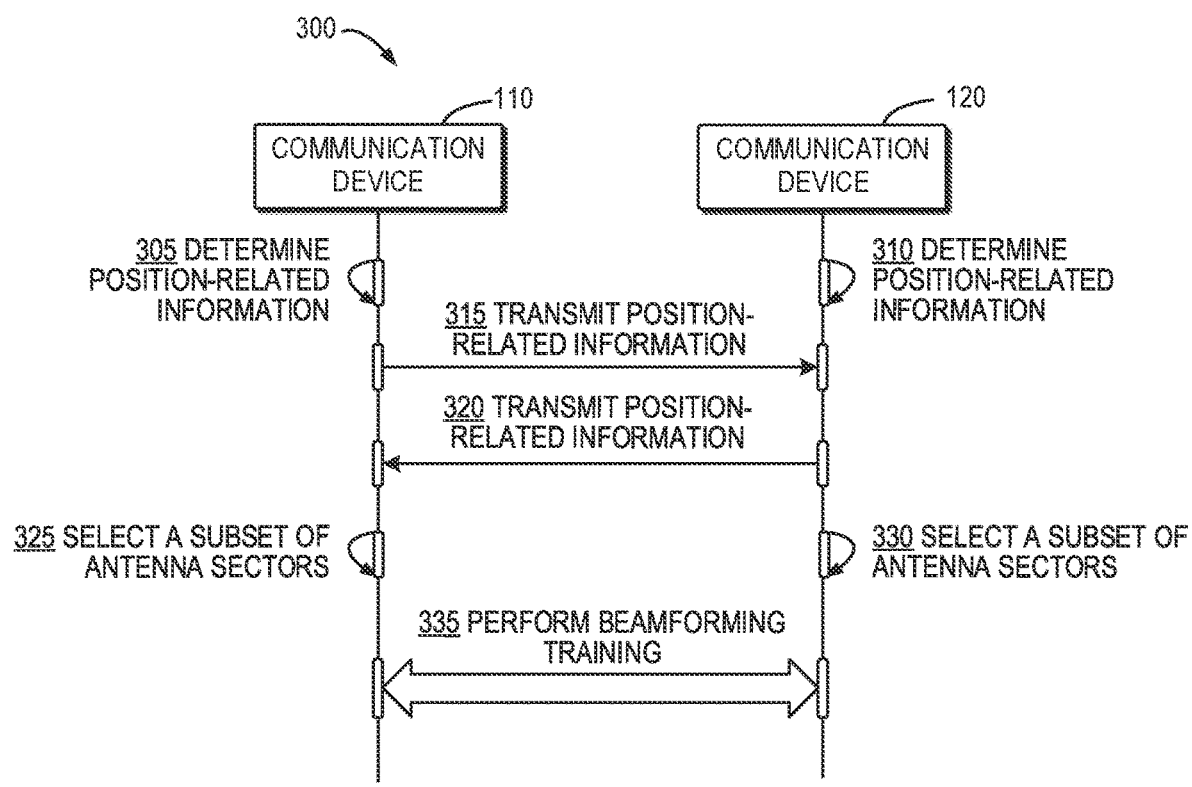
FIG. 3 illustrates a signaling flow for automatic antenna beam alignment between communication devices in accordance with some example embodiments of the present disclosure.

FIG. 3 illustrates a signaling flow 300 for automatic antenna beam alignment between communication devices in accordance with some example embodiments of the present disclosure. For the purpose of discussion, the signaling flow 300 will be described with reference to FIG. 1, to discuss example embodiments of the antenna beam alignment between the communication devices 110 and 120. In such scenarios, the communication devices 110 and 120 are to communicate with each other. From one of the communication devices 110 and 120, the other one of the communication devices 110 and 120 may be considered as a peer communication device.

In the signaling flow 300, the communication device 110 determines 305 its position-related information, and the communication device 120 also determines 310 its position-related information. The position-related information indicates a location and an orientation of the corresponding communication device 110, 120.

In some example embodiments, information indicating the location may include the latitude, longitude, and/or height (altitude) of a geo-location of the corresponding communication device 110, 120. In some example embodiments, information indicating the orientation may include the azimuth angle, the elevation angle, and/or the viewing angle of the corresponding communication device 110, 120. In an example, the orientation may be determined relative to the panel of the antenna array 112, 122 in the corresponding communication device 110, 120. The position-related information may alternatively or additionally include other information that can be used to indicate where the corresponding communication device 110, 120 is located and/or how the corresponding communication device 110, 120 is oriented.

In some example embodiments, the communication devices 110 and/or 120 may each be mounted in association with a positioning device and a compass device to determine its location and orientation, respectively. In an example embodiment, the communication devices 110 and/or 120 may each be integrated with a Global Positioning System (GPS) module to generate location information such as the latitude and longitude information. A height sensor may be also integrated to sense the height (altitude) information at which the corresponding communication device 110 or 120 is located. In an example embodiment, the communication devices 110 and/or 120 each may be integrated with a magnetic sensor (e.g., a 3-aix electronic compass) and/or a gyroscope to detect to the orientation. Other positioning devices and compass devices, either currently available or to be developed, may also be utilized to determine the position-related information. The scope of the present disclosure is not limited in this regard.

In some example embodiments, other than the automatic measurements with the corresponding devices, the position-related information of the communication devices 110 and/or 120 may be set manually or received from other devices.

With their position-related information determined, the communication devices 110 and 120 can exchange their position-related information with each other to facilitate the beamforming training. Specifically, the communication device 110 transmits 315 its position-related information to the communication device 120 and the communication device 120 transmits 320 its position-related information to the communication device 110.

The exchange of the position-related information may depend on the communication capability of the communication devices 110 and 120. As an example, the communication devices 110 and 120 may exchange their position-related information through the Wi-Fi radio communication, for example, by following the IEEE 802.11ay for the first time. As another example, for the communication devices 110 and 120 without Wi-Fi radio, the position-related information may be exchanged based on out-of-band communication. For example, the communication devices 110 and 120 may provide their own position-related information to a remote server, such as a cloud server, and obtain the position-related information of the peer communication device 120 or 110 from the remote server. In some examples, after antenna sector alignment is completed for the first time and a communication link is established between the communication devices 110 and 120 without Wi-Fi radio, WiGig radio communication may be used to further exchange their position-related information if the update on the position-related information is needed.

The position-related information may be communicated in various frames or messages between the communication devices 110 and 120. In some example embodiments, the position-related information of one of the communication devices 110 and 120 may be included in a beacon frame, a probe request, and/or a probe response notified to the peer communication device. In some example embodiments, the position-related information may be included in an associate request, and/or an associate response to be transmitted to the peer communication device. The beacon frame, probe request, and/or probe response may generally be transmitted in a discovery process during which the communication devices 110 and 120 try to discover each other to establish a connection or communication link. The associate request and/or associate response may generally be transmitted in an associate process during which the communication devices 110 and 120 become associated with each other.

It would be appreciated that the position-related information of the communication devices 110 and 120 may be communicated using any other suitable frames or messages communicated between these two devices. In some example embodiments, a vendor self-defined frame may be used by the communication device 110, 120 to specifically transmit the position-related information to the peer communication device.

In some example embodiments, the position-related information may be exchanged between the communication devices 110 and 120 during or before the beamforming training procedure. In some example embodiments, after the communication devices 110 and 120 has established a communication link with each other, they may transmit their respective position-related information periodically or in response to certain events, for example, a change in its location and/or orientation, so as to maintain synchronization on the position-related information.

In some example embodiments, although the position-related information of the peer communication device is illustrated in the signaling flow 300 as being received from the peer communication device, such position-related information may be provided in other manners. For example, the position-related information of the peer communication device may be input manually or provided by other devices to the communication device 110 or 120.

As mentioned above, the position-related information of the peer communication device as well as the local position-related information can be used to facilitate the beamforming training. As illustrated in the signaling flow 300 of FIG. 3, the communication device 110 selects 325 a subset of the plurality of antenna sectors based on the position-related information received from the communication device 120 and its own position-related information.

Figure 4A:
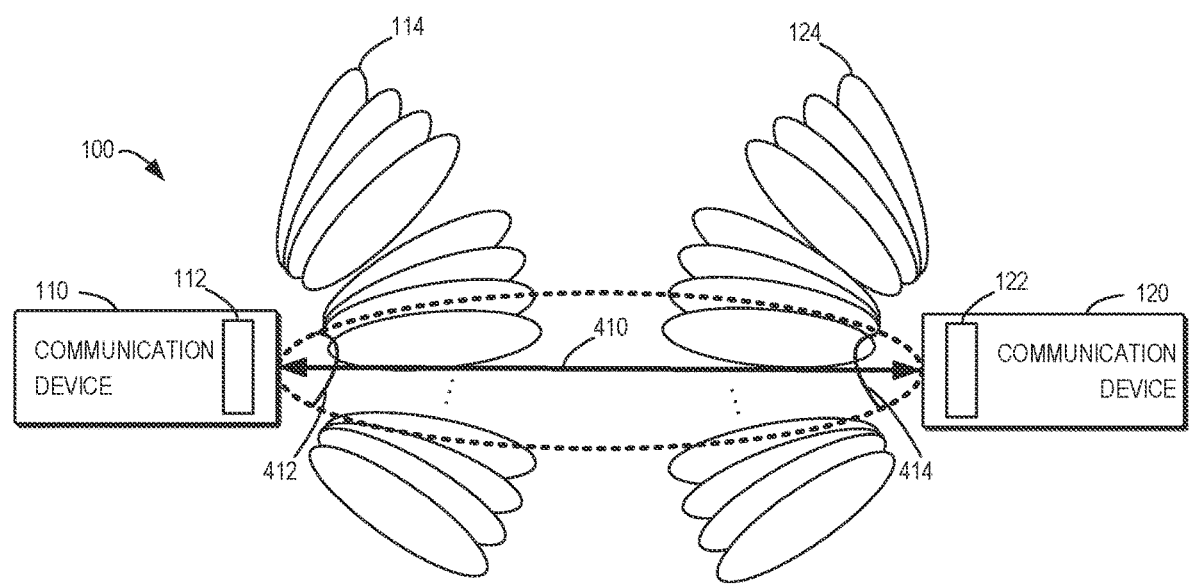
FIGS. 4A-4B illustrate block diagrams of automatic antenna beam alignment in an example communication environment in accordance with some example embodiments of the present disclosure.
Figure 4B:
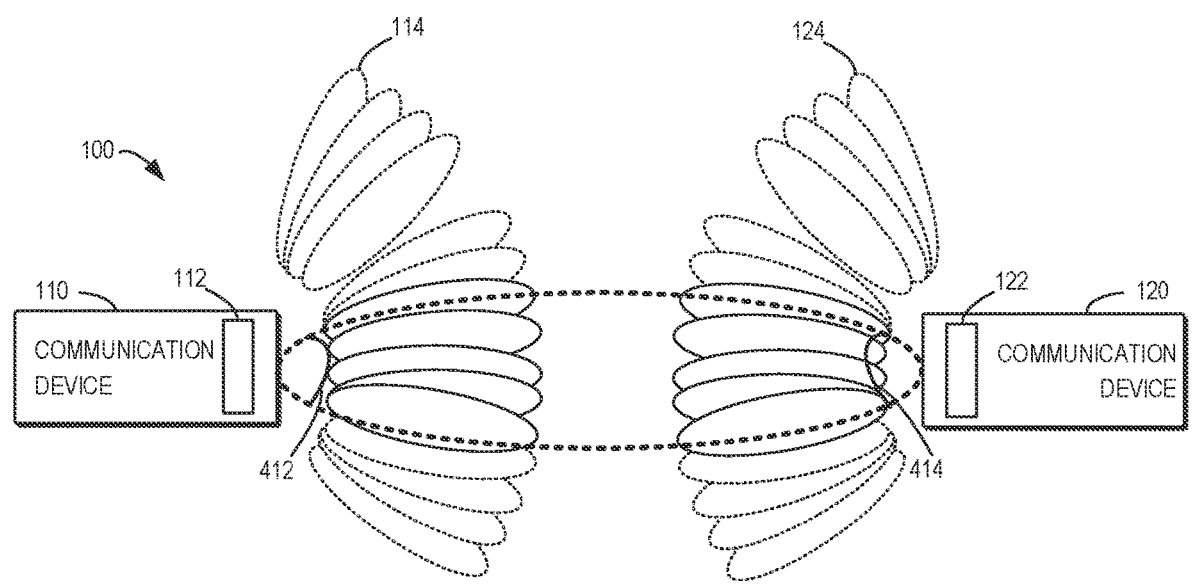

The beams 114 of the antenna sectors of the communication device 110 may radiate to a large angle range. The position-related information of both the communication devices 110 and 120 may be used to determine a narrower angle range aligned to the peer communication device, and one or more antenna sectors may be selected based on the aligned angel range. To better illustrate some example embodiments of the selection of the antenna sectors, FIGS. 4A-4B illustrate a schematic example to show how a subset of better aligned antenna sectors is determined in the example environment 100 where the communication devices 110 and 120 are located.

Specifically, the communication device 110 may determine a relative direction of the peer communication device 120 based on the locations of the two devices. As illustrated in FIG. 4A, according to the position-related information, the communication device 110 may determine a relative direction 410 of the location of the communication device 120 in relationship to the current location of the communication device 110. The communication device 110 may further determine an angel range 412 with respect to the relative direction based on its orientation and the orientation of the communication device 120 such that the angle range 412 is substantially aligned to the communication device 120. In some example embodiments, the angle range 412 may be defined by an azimuth range and/or an elevation range. For example, the angle range 412 may be defined by a predetermined azimuth range and/or an elevation range from the relative direction 410.

One or more directional beams 114 towards the angle range 412 may have a high probability of matching with a beam from the communication device 120. To select the subset of antenna sectors for beamforming training, the communication device 110 may determine the shapes, orientations, and/or widths of the respective beams 114, to find which beams 114 are within the angle range 412. In some example embodiments, the orientation of a beam may be defined by the orientation of its normal line. In some example embodiments, the 3 dB beam width (in both horizontal and vertical directions) may be considered.

The shape, orientation, and/or width of each beam 114 may be determined if the highest antenna gain and the transmit power of the communication device 110 are configured. According to the antenna gain and the transmit power, the communication device 110 may calculate the signal strength in the space and determine a three-dimensional map for the directional beams 114.

By matching the three-dimensional map for the directional beams 114 with the angle range 412, the communication device 110 may determine which beams 114 are within this angle range 412, as illustrated in FIG. 4B and select the corresponding beams 114. In the example of FIG. 4B, the unselected beams 114 are illustrated with dotted lines. In some example embodiments, one or more beams 114 nearby the angle range 412 may also be selected to reduce any risk of mismatching with the communication device 120. The communication device 120 may determine the corresponding antenna sectors generating the selected beams 114.

With one or more of the antenna sectors selected based on the position-related information, the communication device 110 performs 335 beamforming training with the communication device 120 using the selected subset of antenna sectors. The communication device 110 retains the selected antenna sectors and operates using the selected antenna sectors during the beamforming training. The unselected antenna sectors may not be considered as candidates for matching with a beam from the communication device 120. In some example embodiments, the communication device 120 may update the antenna information used for the beamforming training, for example, by deleting information about the unselected antenna sectors from a codebook using for the beamforming training. The beamforming training may be implemented according to any known approaches to facilitate the two communication devices 120 to determine their beams for communication with each other.

According to example embodiments of the present disclosure, since the number of the antenna sectors scanned in the beamforming training is reduced, the total time for the beamforming training can be reduced. It is beneficial for device installation, maintenance and network management. On the other hand, the selected antenna sectors are believed to generate beams aligned to the peer communication device according to the positioned-related information, the probability of finding the best match beam during the beamforming training can also be increased.

On the side of the communication device 120, if it can also obtain the position-related information of the peer communication device 110, it also selects 330 a subset of all its antenna sectors in a similar way as discussed above with respect to the communication device 110. For example, in the example environment illustrated in FIG. 4A, the communication device 120 may also determine an angle range 414 aligned to the communication device 110 based on the position-related information of the two devices. One or more beams 124 within the angel range 414 and thus the corresponding antenna sector(s) of the antenna array 122 may be selected. The angel range 414 may be the same as or different from the angel range 412 used at the communication device 110. The communication device 120 can use the selected subset of antenna sectors to perform 335 the beamforming training with the communication device 110.

After the beamforming training is completed, the communication device 110 may determine an antenna sector from the selected subset of antenna sectors that is found to match with the communication device 120. Similarly, the communication device 120 may determine an antenna sector from the selected subset of antenna sectors that is found to match with the communication device 110. The communication devices 110 and 120 may establish a connection or communication link and communicate with each other using the match antenna sectors.

In some example embodiments, after the communication devices 110 and 120 are connected, the antenna beam alignment may be triggered if the position-related information of the communication devices 110 and/or 120 is changed, for example, if the antenna(s) of the corresponding device(s) is distorted. In such case, the communication devices 110 and/or 120 may re-select a subset of antenna sectors to perform the beamforming training so as to determine the best match beams for following communication.

In the example embodiments discussed with reference to FIG. 3, both the communication devices 110 and 120 implement similar processes to reduce the number of antenna sectors for beamforming training based on their position-related information. In some example embodiments, it is possible that only one of the communication devices 110 and 120 reduce the number of antenna sectors according to the example embodiments of the present disclosure. In this case, the total scan time may also be decreased as compared with both the communication devices 110 and 120 scanning all the possible combinations of transmitter-receiver sectors.

In some example embodiments, the process of the antenna beam alignment discussed in the example embodiments may be implemented by other device than the communication device 110 or 120. That is, a controller device may implement the process of the antenna beam alignment to control the communication devices 110 and/or 120 to select a subset of their antenna sectors and cause the communication devices 110 and/or 120 to perform beamforming training using the selected antenna sectors.

Figure 5:
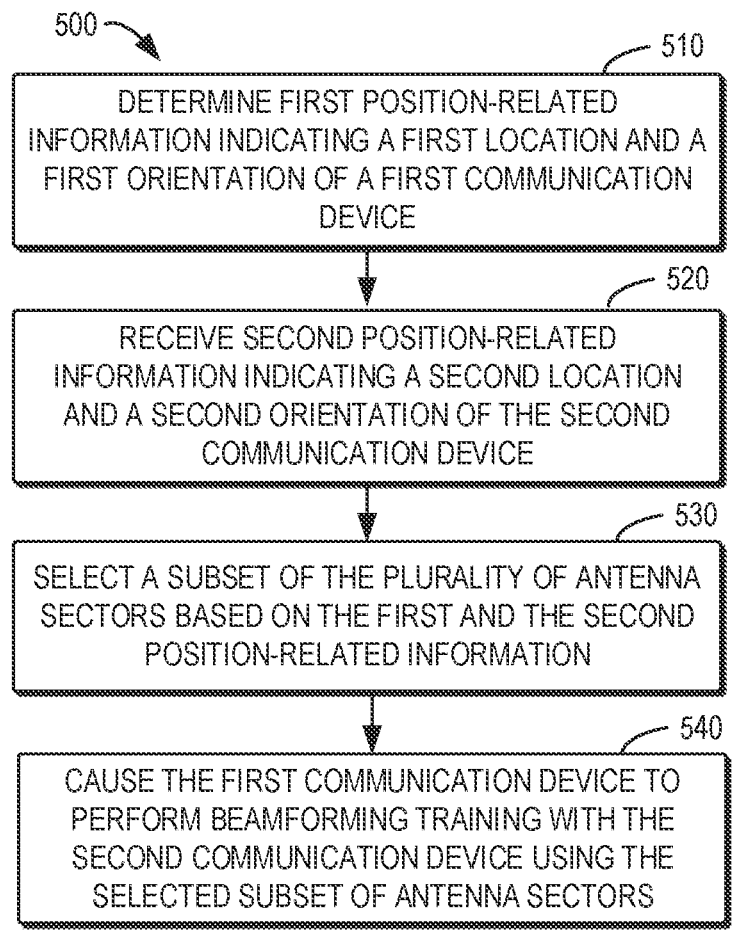
FIG. 5 illustrates a flowchart of a method in accordance with some example embodiments of the present disclosure.

FIG. 5 illustrates a flowchart of a method 500 in accordance with some example embodiments of the present disclosure. The method 500 can be carried out by either the communication device 110 or the communication device 120 according to the embodiments described herein. In some example embodiments, both of the communication devices 110 and 120 may similarly perform the method 500. While only some blocks are shown in the method 500, the method 500 may comprise other operations described herein. For convenience of discussion of the method 500, one of the communication devices 110 and 120 implementing the method 500 is referred to as a first communication device, and the other one of the communication devices 110 and 120 is referred to as a second communication device.

At 510, the first communication device determines first position-related information indicating a first location and a first orientation of a first communication device. The first communication device comprises a plurality of antenna sectors configured for generating respective directional beams. In some example embodiments, the first communication device may use a positioning device and a compass device mounted in association with the first communication device to determine the first position-related information. In some example embodiments, the first communication device may transmit the first position-related information to the second communication device.

At 520, the first communication device receives, from the second communication device, second position-related information indicating a second location and a second orientation of the second communication device. In some example embodiments, the first communication device may receive the second position-related information in at least one of a beacon frame, a probe request, a probe response, an associate request, an associate response, or a vendor self-defined frame from the second communication device.

At 530, the first communication device selects a subset of the plurality of antenna sectors based on the first and the second position-related information. In some example embodiments, the first communication device may determine an angle range aligned to the second communication device based on the first and the second position-related information, and select, from the plurality of antenna sectors, at least one antenna sector with at least one directional beam towards the determined angel range.

In some example embodiments, in selecting the at least one antenna sector, the first communication device may determine at least one of shape information, orientation information, and width information of the respective directional beams generated by the plurality of antenna sectors. The first communication device may select the at least one antenna sector based on the at least one of the shape information, the orientation information, and the width information.

At 540, the first communication device causes the first communication device to perform beamforming training with the second communication device using the selected subset of antenna sectors.

In some example embodiments, after the beamforming training is completed, the first communication device may determine, based on a result of the beamforming training, a match antenna sector from the selected subset of antenna sectors. The first communication device may communicate with the second communication device using the match antenna sector.

Figure 6:
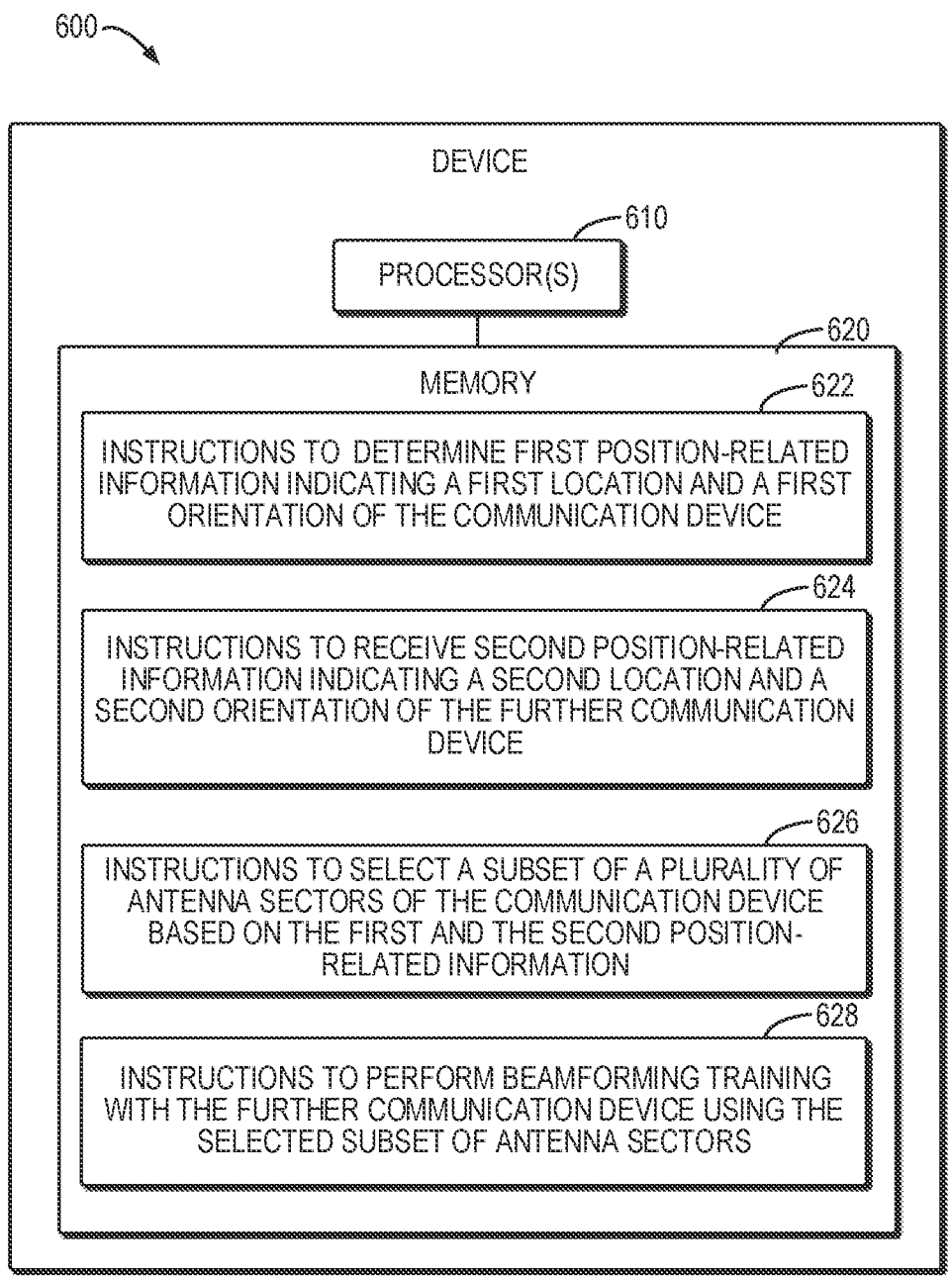
FIG. 6 illustrates a block diagram of a communication device in accordance with some example embodiments of the present disclosure.

FIG. 6 illustrates a block diagram of an example device 600 in accordance with some example embodiments of the present disclosure. The device 600 comprises at least one processor 610 and a memory 620 coupled to the at least one processor 610. The memory 620 stores instructions to cause the at least one processor 610 to implement acts of a method.

As illustrated in FIG. 6, the memory 620 stores instructions 622 to determine first position-related information indicating a first location and a first orientation of the communication device.

In some example embodiments, the instructions 622 to determine the first position-related information comprise instructions to determine the first position-related information using a positioning device and a compass device mounted in association with the first communication device.

The memory 620 further stores instruction 624 to receive, from a further communication device, second position-related information indicating a second location and a second orientation of the further communication device.

In some example embodiments, the instructions 624 to receive the second position-related information comprise instructions to receive the second position-related information in at least one of a beacon frame, a probe request, a probe response, an associate request, an associate response, or a vendor self-defined frame from the further communication device.

In some example embodiments, the memory 620 further stores instructions 626 to select a subset of a plurality of antenna sectors of the communication device based on the first and the second position-related information. The plurality of antenna sectors are configured for generating respective directional beams In some example embodiments, the memory 620 further stores instructions 628 to perform beamforming training with the further communication device using the selected subset of antenna sectors.

In some example embodiments, the instructions 626 to select the subset of the plurality of antenna sectors may comprise instructions to determine an angle range aligned to the further communication device based on the first and the second position-related information; and to select, from the plurality of antenna sectors, at least one antenna sector with at least one directional beam towards the determined angel range.

In some example embodiments, the instructions 626 to select the at least one antenna sector may comprise instructions to determine at least one of shape information, orientation information, and width information of the respective directional beams generated by the plurality of antenna sectors; and to select the at least one antenna sector based on the at least one of the shape information, the orientation information, and the width information.

In some example embodiments, the memory 620 may further comprise instructions to transmit the first position-related information to the further communication device.

In some example embodiments, the memory 620 may further comprise instructions to determine, based on a result of the beamforming training, a match antenna sector from the selected subset of antenna sectors; and to communicate with the further communication device using the match antenna sector.

The present disclosure also provides at least one computer program product tangibly stored on a non-transitory computer-readable storage medium. The computer program product includes program codes or instructions which can be executed to carry out the method as described above with reference to FIG. 5.

While the above discussion used a Wi-Fi communication standard as an illustrative example, in other embodiments a wide variety of communication standards and, more generally, wireless communication technologies may be used. Furthermore, while some of the operations in the foregoing embodiments were implemented in hardware or software, in general the operations in the preceding embodiments can be implemented in a wide variety of configurations and architectures. Therefore, some or all of the operations in the foregoing embodiments may be performed in hardware, in software or both.

It should be noted that specific terms disclosed in the present disclosure are proposed for convenience of description and better understanding of example embodiments of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   determining first position-related information indicating a first location and a first orientation of a first communication device, the first communication device comprising a plurality of antenna sectors configured for generating respective directional beams;
   receiving, from a second communication device, second position-related information indicating a second location and a second orientation of the second communication device;
   selecting a subset of the plurality of antenna sectors based on the first and the second position-related information by:
      determining an angle range aligned to the second communication device based on the first and the second position-related information;
      selecting, from the plurality of antenna sectors, at least one antenna sector with at least one directional beam towards the determined angel range, wherein selecting the at least one antenna sector comprises:
  determining at least one of shape information, orientation information, and width information of the respective directional beams generated by the plurality of antenna sectors;
  selecting the at least one antenna sector based on the at least one of the shape information, the orientation information, and the width information; and
causing the first communication device to perform beamforming training with the second communication device using the selected subset of antenna sectors.

2. The method of claim 1, wherein receiving the second position-related information comprises:
  receiving the second position-related information in at least one of a beacon frame, a probe request, a probe response, an associate request, an associate response, or a vendor self-defined frame from the second communication device.

3. The method of claim 1, wherein determining the first position-related information comprises:
  determining the first position-related information using a positioning device and a compass device mounted in association with the first communication device.

4. The method of claim 1, further comprising:
  transmitting the first position-related information to the second communication device.

5. The method of claim 1, further comprising:
  determining, based on a result of the beamforming training, a match antenna sector from the selected subset of antenna sectors; and
  communicating with the second communication device using the match antenna sector.

6. A communication device comprising:
  at least one processor; and
  a memory coupled to the at least one processor, the memory storing instructions to cause the at least one processor to implement acts comprising:
    determining first position-related information indicating a first location and a first orientation of the communication device;
    receiving, from a further communication device, second position-related information indicating a second location and a second orientation of the further communication device;
    selecting a subset of a plurality of antenna sectors of the communication device based on the first and the second position-related information, the plurality of antenna sectors configured for generating respective directional beams, wherein selecting the subset of the plurality of antenna sectors comprise:
      determining an angle range aligned to the further communication device based on the first and the second position-related information;
      selecting, from the plurality of antenna sectors, at least one antenna sector with at least one directional beam towards the determined angel range, wherein selecting the at least one antenna sector comprises:
        determining at least one of shape information, orientation information, and width information of the respective directional beams generated by the plurality of antenna sectors; and
        selecting the at least one antenna sector based on the at least one of the shape information, the orientation information, and the width information; and
    performing beamforming training with the further communication device using the selected subset of antenna sectors.

7. The communication device of claim 6, wherein receiving the second position-related information comprises:
  receiving the second position-related information in at least one of a beacon frame, a probe request, a probe response, an associate request, an associate response, or a vendor self-defined frame from the further communication device.

8. The communication device of claim 6, wherein determining the first position-related information comprises:
  determining the first position-related information using a positioning device and a compass device mounted in association with the first communication device.

9. The communication device of claim 6, wherein the acts further comprise:
  transmitting the first position-related information to the further communication device.

10. The communication device of claim 6, wherein the acts further comprise:
  determining, based on a result of the beamforming training, a match antenna sector from the selected subset of antenna sectors; and
  communicating with the further communication device using the match antenna sector.

11. A non-transitory computer-readable medium comprising instructions stored thereon which, when executed by an apparatus, cause the apparatus to:
  determine first position-related information of a first communication device and second position-related information of a second communication device, the first position-related information indicating a location and an orientation of the first communication device, and the second position-related information indicating a location and an orientation of the second communication device;
  select, based on the first and the second position-related information, at least one antenna sector from a plurality of antenna sectors comprised in the first communication device, the plurality of antenna sectors configured for generating respective directional beams, wherein causing the apparatus to select the subset of the plurality of antenna sectors comprise instructions causing the apparatus to:
    determine an angle range aligned to the second communication device based on the first and the second position-related information;
    select, from the plurality of antenna sectors, at least one antenna sector with at least one directional beam towards the determined angel range, wherein the instructions causing the apparatus to select the at least one antenna sector comprise instructions causing the apparatus to:
      determine at least one of shape information, orientation information, and width information of the respective directional beams generated by the plurality of antenna sectors;
      select the at least one antenna sector based on the at least one of the shape information, the orientation information, and the width information; and
  cause the first communication device to perform beamforming training with the second communication device using the at least one selected antenna sector.

12. The computer-readable medium of claim 11, wherein the instructions causing the apparatus to determine the second position-related information comprise instructions causing the apparatus to:
 receive the second position-related information in at least one of a beacon frame, a probe request, a probe response, an associate request, an associate response, or a vendor self-defined frame from the second communication device.

13. The computer-readable medium of claim 11, wherein the instructions causing the apparatus to determine the first position-related information comprise instructions causing the apparatus to:
 determine the first position-related information using a positioning device and a compass device mounted in association with the first communication device.

14. The computer-readable medium of claim 11, wherein the instructions further comprise instructions causing the apparatus to:
 transmit the first position-related information to the second communication device.

\* \* \* \* \*